United States Patent [19]

Rembold et al.

[11] Patent Number: 4,997,717
[45] Date of Patent: Mar. 5, 1991

[54] PHOTOCURABLE ABRASIVES

[75] Inventors: Manfred Rembold, Aesch; Stephan Ilg, Giebenach, both of Switzerland

[73] Assignee: Ciba-Geigy Corporation, Ardsley, N.Y.

[21] Appl. No.: 453,331

[22] Filed: Dec. 18, 1989

Related U.S. Application Data

[63] Continuation of Ser. No. 377,789, Jul. 7, 1989, abandoned, which is a continuation of Ser. No. 169,522, Mar. 17, 1988, abandoned.

[30] Foreign Application Priority Data

Mar. 27, 1987 [CH] Switzerland ............... 1181/87

[51] Int. Cl.$^5$ ................... B32B 27/38; B05D 3/06
[52] U.S. Cl. ...................... 478/413; 417/541; 417/203; 417/204; 417/205
[58] Field of Search ............ 427/541, 203, 204, 205; 430/286; 522/31; 51/295, 298; 428/331, 413

[56] References Cited

U.S. PATENT DOCUMENTS

| 4,047,903 | 1/1977 | Hess et al. ............... 51/298 |
| 4,058,401 | 11/1977 | Crivello ............... 96/115 |
| 4,256,828 | 3/1981 | Smith . |
| 4,394,403 | 7/1983 | Smith ............... 427/42 |
| 4,457,766 | 7/1984 | Caul ............... 51/298 |
| 4,751,138 | 6/1988 | Tumey et al. ............... 51/295 |

FOREIGN PATENT DOCUMENTS

| 94915 | 11/1983 | European Pat. Off. . |
| 0109851 | 5/1984 | European Pat. Off. . |
| 0168065 | 1/1986 | European Pat. Off. . |
| 2120263 | 5/1983 | United Kingdom . |
| 2177093 | 1/1987 | United Kingdom . |

OTHER PUBLICATIONS

C.A. 104: 150133A (1986).

Primary Examiner—Stanley Silverman
Attorney, Agent, or Firm—Stephen V. O'Brien

[57] ABSTRACT

The preparation of abrasives, especially abrasive papers and abrasive fabrics, is improved by using an epoxy resin in conjunction with a cationic photoinitiator as binder for the abrasive particles. The binder is cured by irradiation with shortwave light and subsequent heating. The process is distinguished by low curing temperatures and brief curing times.

13 Claims, No Drawings

PHOTOCURABLE ABRASIVES

This application is a continuation of application Ser. No. 377,789, filed 7/7/89, which is a continuation of Ser. No. 169,522, filed 3/17/88, now abandoned.

The invention relates to a process for the preparation of abrasives using cationically photocurable binders and special curing catalysts, and to the abrasives so obtained by said process. The invention relates in particular to abrasives on two-dimensional flexible supports such as abrasive papers and abrasive fabrics.

In elastically bonded abrasives, such as abrasive papers or abrasive fabrics as well as in rigidly bonded abrasives (abrasive wheels), the binders increasingly used for the abrasive particles are synthetic resins, especially phenolic resins, aminoplasts and epoxy resins. Curing is effected by prolonged heating, which may take up to several hours. In the production of such abrasives, the curing time is a decisive step for the production rate, and the reduction of the curing time is for this reason of great importance.

A very rapid method of curing binder resins which has recently been applied in the field of lacquer technology is photocuring, in which suitable photosensitive binder systems are cured by irradiation with shortwave light, preferably with UV lamps. This curing step takes the form of a radical polymerisation of olefinically unsaturated monomers or oligomers, for example acrylates and unsaturated polyester resins.

In U.S. Pat. No. 4,047,903 the proposal has already been made to use such photosensitive unsaturated systems as binders for abrasives and to cure them by electron beam radiation. The curing times attainable in this process are indeed very short; but the process is dependent on the use of unsaturated systems as binders, for example unsaturated polyester resins, acrylated epoxides or acrylates of polyols. These binders do not satisfy all application requirements, e.g. with respect to heat stability or flexibility. Recently, therefore, the combined use of photocurable unsaturated compounds and phenolic resins has been proposed (German Offenlegungsschrift No. 3 603 398). This procedure permits rapid intermediate drying by electron beam radiation, but again subsequently necessitates a time-consuming final heat curing.

The proposal has already been made (GB No. 2 120 263 A) to provide catalysts for curing phenolic plastics and aminoplasts by UV irradiation in the resin, whereby the curing can be accelerated without bubble formation. The requisite curing times, however, are still considerable.

It has now been found that such abrasives, in particular abrasive papers and abrasive fabrics, based on epoxy resins can be cured in a two-step process in a relatively short time by not curing the epoxy resins in conventional manner by reaction with a hardener (e.g. an amine or anhydride), but by effecting a photochemical cationic curing of the epoxy resin.

It is known that epoxy resins can be cationically polymerised and thereby cured without the addition of hardeners. To this end the customary cationic polymerisation catalysts are used, for example Lewis acids. It is further known that such a cationic polymerisation can be initiated photochemically by using compounds as catalysts that form Lewis acids or other cationically active polymerisation initiators. Examples of such photoactivatable catalysts are hexafluorophosphates, tetrafluoroborates or hexafluoroarsenates of triarylsulfonium salts (e.g. U.S. Pat. No. 4,058,401), of diaryliodonium salts (e.g. U.S. Pat. No. 4,394,403) or of arene/iron salts (e.g. European published patent application No. 94 915).

The use of the cationic photopolymerisation of epoxy resins as binders for abrasives is novel and, compared with the use of conventionally cured epoxy resins, has the advantage of longer pot life and reduced curing time. Compared with phenolics and aminoplasts, the epoxy resins require lower curing temperatures and substantially shorter curing times.

The epoxy resin which contains the photoinitiator is storage-stable for an almost unlimited period of time at room temperature in the absence of light, whereas mixtures of epoxy resins with conventional hardeners, e.g. polyamines, undergo slow curing even at room temperature, so that such mixtures must be processed quickly.

The epoxy resin containing the photoinitiator is applied to the support and irradiated with actinic light before or after applying the abrasive particles. The catalyst is activated by this irradiation. Curing is effected by subsequent or simultaneous heating. Before or after heating it is possible to apply a second coating, which consists of the same binder or another binder.

The process of this invention for the preparation of abrasives accordingly comprises applying a layer of binder to a support, briefly irradiating said layer with actinic light, applying the abrasive particles to the still tacky layer before or after irradiation and effecting subsequent or simultaneous heat curing, said binder being an epoxy resin which contains at least one cationic photoinitiator, and, if desired, applying a second layer of binder subsequent to the application of the abrasive particles or to the heat curing of the first layer, the binder of said second layer being the same as, or different from, the binder of the first layer.

Paper or fabric is preferably used as support. The support is normally treated with a primer for sealing the pores, which primer may also consist of a photocurable epoxy resin. The epoxy resin can be applied to this support by conventional coating methods, for example by coating, roller coating, knife-coating, spraying, dipping or casting.

All customary epoxy resins may be used, such as aliphatic or cycloaliphatic epoxy resins. These are compounds containing at least two epoxy groups in the molecule. Examples of such epoxy resins are the glycidyl ethers and β-methylglycidyl ethers of aliphatic or cycloaliphatic diols or polyols, e.g. those of ethylene glycol, propane-1,2-diol, propane-1,3-diol, butane-1,4-diol, diethylene glycol, polyethylene glycol, polypropylene glycol, glycerol, trimethylolpropane or 1,4-dimethylolcyclohexane or of 2,2-bis(4-hydroxycyclohexyl)propane and N,N-bis(2-hydroxyethyl)aniline; the glycidyl ethers of diphenols and polyphenols, for example of resorcinol, of 4,4'-dihydroxydiphenyl-2,2-propane, of novolaks or of 1,1,2,2-tetrakis(4-hydroxyphenyl)ethane. Further examples are N-glycidyl compounds, for example the diglycidyl compounds of ethylene urea, 1,3-propylene urea or 5-dimethylhydantoin, or of 4,4'-methylene-5,5'-tetramethyldihydantoin, or those of triglycidylisocyanurate.

Further technically important glycidyl compounds are the glycidyl esters of carboxylic acids, in particular di- and polycarboxylic acids, for example the glycidyl esters of succinic acid, adipic acid, azelaic acid, sebacic acid, phthalic acid, terephthalic acid, tetrahydrophthalic acid and hexahydrophthalic acid, isophthalic acid or trimellitic acid, or of dimerised fatty acids.

Examples of polyepoxides which are not glycidyl compounds are the diepoxides of vinylcyclohexane and dicyclopentadiene, 3-(3',4'-epoxycyclohexyl)-8,9-epoxy-2,4-dioxaspiro[5.5]undecane, of the 3',4'-epoxycyclohexylmethyl ester of 3,4-epoxycyclohexanecarboxylic acid, butadiene diepoxide or isoprene diepoxide, epoxidised linoleic acid derivatives or epoxidised polybutadiene.

Preferred epoxy resins are diglycidyl ethers or advanced diglycidyl ethers of dihydric phenols or of dihydric aliphatic alcohols containing 2 to 4 carbon atoms. Particularly preferred epoxy resins are the diglycidyl ethers or advanced diglycidyl ethers of 2,2-bis(4hydroxyphenyl)propane and bis(4-hydroxyphenyl)methane.

As a large number of different epoxy resins are at present commerically available, it is possible to modify the properties of the binder substantially according to the process of this invention. A further possibility of modifying the binder resides in the use of mixtures of different epoxy resins as well as in the addition of flexibilisers and reactive diluents. Yet a further possibility of modifying the binder is the use of a mixture of an epoxy resin and a phenolic resin.

To facilitate application, the epoxy resins can be diluted with a solvent, for example if application is made by spraying. However, it is preferred to apply the epoxy resin in the solvent-free state. Resins which are viscous to solid at room temperature can be applied hot.

Fillers or other modifiers, e.g. coloured pigments, can be added to the resin. Examples of fillers are calcium carbonate, alumina, barium sulfate, graphite, molybdenum sulfide or iron sulfide.

The abrasive particles are applied to the still tacky coating, preferably by electrostatic spraying. All materials customarily employed for abrasives are used, e.g. corundum, diamonds, silicon carbide (carborundum), boron carbide, tungsten carbide, emery, sand or glass.

Irradiation can be effected before or after application of the abrasive particles. To this end the abrasive is irradiated with light, preferably in the wavelength range from 200–600 nm. Irradiation can be performed in simple manner in a continuously operating irradiation apparatus, as the required irradiation time is only in the order of magnitude of about one second. No material curing of the resin takes place during this irradiation: only the catalyst is activated.

The complex salts eligible for use in the process of this invention are the aromatic sulfonium salts disclosed in U.S. Pat. No. 4,058,401 or the aromatic iodonium salts disclosed in U.S. Pat. No. 4,393,403, or the arene/iron complex salts disclosed in European published patent application No. 94 915. Common to all such complex salts is the nature of the anions of formula $BF_4^-$, $PF_6^-$, $AsF_6^-$, $SbF_6^-$, $SbCl_6^-$ or $BiCl_6^-$.

It is preferred to use arene/iron complex salts of formula $[R^1\text{-Fe-}R^2]^+[MX_m]^-$, wherein $R^1$ is an uncharged arene ligand, $R^2$ is a monovalent cyclopentadienyl anion or methylcyclopentadienyl anion and $[MX_m]^-$ is an anion of formula $BF_4^-$, $PF_6^-$, $AsF_6^-$ or $SbF_6^-$.

An uncharged arene ligand $R^1$ can be, for example, unsubstituted or $C_1$-$C_{12}$alkyl-substituted benzene, naphthalene, phenanthrene, anthracene, pyrene or stilbene.

Examples of such arene/iron complexes are:

($\eta^6$-benzene)($\eta^5$-cyclopentadienyl)-iron(II)hexafluorphosphate, ($\eta^6$-toluene)($\eta^5$-methylcyclopentadienyl)-iron(II)hexafluorphosphate, ($\eta^6$-cumene)($\eta^5$-cyclopentadienyl)-iron(II)hexafluorphosphate, ($\eta^6$-cumene)($\eta^5$-cyclopentadienyl)-iron(II)tetrafluorborate, ($\eta^6$-cumene)($\eta^5$-cyclopentadienyl)-iron(II)hexafluorantimonate, ($\eta^6$-cumene)($\eta^5$-cyclopentadienyl)-iron(II)hexafluorarsenate, ($\eta^6$-naphthalene)($\eta^5$-cyclopentadienyl)-iron(II)hexafluorphosphate, ($\eta^6$-2-methylnaphthalene)($\eta^5$-cyclopentadienyl)-iron(II)hexafluorphosphate, ($\eta^6$-pyrene)($\eta^5$-cyclopentadienyl)-iron(II)hexafluorphosphate, ($\eta^6$-stilbene)($\eta^5$-cyclopentadienyl)-iron(II)hexafluorphosphate.

The required amount of photoinitiator is preferably about 0.1 to 10% by weight, preferably 1 to 5% by weight, based on the epoxy resin.

The activity of these arene/iron compounds can be further enhanced by the addition of sensitisers or oxidative activators or of both modifiers. Sensitisers increase the absorption, whereby a greater utilisation of light is achieved. The photochemical activation of the catalyst then proceeds even more rapidly, often in fractions of a second. Examples of sensitisers are polycyclic aromatic compounds or aromatic heterocycles, acetophenone and benzophenone derivatives, benzils, stilbenes, xanthones, thioxanthones, anthracenes and phthalimides. Individual compounds suitable for the purpose are listed in published European patent application No. 152 377 on pages 8 and 9. It is preferred to use a thioxanthone, anthracene or a coumarin compound as sensitiser.

Oxidative activators accelerate the cationic polymerisation and thus the heat curing process. They permit a further reduction of the curing temperature or the curing time or both process conditions. To this end it is preferred to use an organic peroxide or hydroperoxide, a percarboxylic acid or a quinone. Examples of such compounds are di-tert-butyl peroxide, tert-butylhydroperoxide, cumene hydroperoxide, perbenzoic acid, m-chloroperbenzoic acid or benzoquinone.

The heat curing can be effected in heat chambers or drying ovens or by irradiation with infrared light. Abrasives on a support (paper, textile, plastic) can only be cured at relatively low temperatures, for which reason lengthy curing times (1–2 hours) are required. In the process of this invention, however, curing times of 1–10 minutes suffice even at low curing temperatures in the range from about 50°–150° C. Even shorter curing times are possible in infrared curing. This permits a substantially higher production rate than with conventional processes. If the resins employed are solvent-free, the problem of removing the solvent from the exhaust air does not arise. Also no condensates are released during curing.

It is conventional to apply a second binder layer after the application of the abrasive particles. This procedure is also possible in the process of this invention. The binder of this top layer can also be a cationically cured epoxy resin. It can then be applied wet-in-wet (i.e. before the heat cure) and heat cured together with the underneath layer. However, it is also possible to apply the top layer only after the heat curing of the underneath layer, so that the binder for the top layer can be freely chosen. In this case, the top layer must be cured in a second thermal process.

The following Examples illustrate the process of this invention in detail, without implying any limitation to the mode of performing it. Parts are by weight, unless otherwise indicated.

EXAMPLES

The following resins are used:
R-1 aromatic epoxy resin based on bisphenol A having an epoxide equivalent of 183-193 g/eq. (Araldite® GY 250, Ciba-Geigy AG);
R-2 cycloaliphatic epoxy resin having an epoxide equivalent of 133-143 g/eq. (Araldite® CY 179);
R-3 glycidyl ether of a phenolic novolak having an epoxide equivalent of 172-179 g/eq. (Araldite® EPN 1139);
R-4 glycidyl ether of a phenolic novolak having an epoxide equivalent of 173-185 g/eq. (Araldite® XPY 307);
R-5 phenolic resin as 57% solution in butanol (Uravar® L9BT57, DSM Resins).

The cationic photoinitiator employed is:
PI-1 ($\eta^6$-cumene)($\eta^5$-cyclopentadienyl)iron(II)hexafluorophosphate,
PI-2 a 55% solution of an aromatic sulfonium hexafluorophosphate (FX-512, 3M Corp.) in propylene carbonate.

The oxidative activator employed is:
A-1 cumene hydroperoxide.

The initiators are dissolved in the resins. Then the resin is applied in a layer thickness of 50 μm to a 200 μm aluminium sheet. The samples are transported at different speeds under a fusion D-lamp. Corundum is subsequently strewed on to the still fluid resin film in an amount of about 500 g/m² by means of a vibration sieve. A portion of each sample is not strewed with corundum. The pendulum hardness is determined on this portion after curing.

The samples are then cured in a recirculating air drier, the temperature and the time being varied (q.v. Table 1). The penetration of the cure is evaluated by measuring the pendulum hardness (according to DIN 53 157) directly after curing and after 30 minutes as well as after storing the cured samples for 24 hours. It is typical of cationically cured resins that postcuring additionally occurs on storage.

TABLE 1

| Resin (+filler) | Initiator/ activator | Transport speed on irradiation | Thermal treatment | Pendulum hardness [s] immediately | after 30 min | after 24 h |
|---|---|---|---|---|---|---|
| H-1 | 2% of PI-1 | 10 m/min | 60 s - 100° | 75 | 84 | 170 |
| H-1 | 2% of PI-1 | 10 m/min | 45 s - 150° | 100 | 100 | 100 |
| H-1 | 4% of PI-1 | 10 m/min | 60 s - 100° | 145 | 160 | 210 |
| H-1 | 4% of PI-1 | 20 m/min | 60 s - 150° | 120 | 125 | 160 |
| H-1 | 2% of PI-½% of A-1 | 20 m/min | 90 s - 60° | 84 | 84 | 160 |
| H-1 | 4% of PI-½% of A-1 | 30 m/min | 60 s - 60° | 75 | 77 | 180 |
| H-1 | 4% of PI-½% of A-1 | 40 m/min | 90 s - 60° | 50 | 50 | 165 |
| H-2 | 2% of PI-1 | 20 m/min | 180 s - 50° | 44 | 64 | 148 |
| H-2 | 4% of PI-1 | 20 m/min | 120 s - 50° | 84 | 140 | 220 |
| H-2 | 4% of PI-1 | 20 m/min | 15 s - 100° | 160 | 182 | 200 |
| H-1/H-2 90:10 | 4% of PI-1 | 40 m/min | 30 s - 100° | 84 | 84 | 115 |
| 80:20 | 4% of PI-1 | 40 m/min | 30 s - 100° | 90 | 90 | 103 |
| 70:30 | 4% of PI-1 | 40 m/min | 30 s - 100° | 80 | 80 | 92 |
| H-3 | 2% of PI-1 | 10 m/min | 30 s - 150° | 140 | 155 | 180 |
| H-3 | 4% of PI-1 | 20 m/min | 30 s - 150° | 120 | 130 | 170 |
| H-4 | 2% of PI-1 | 10 m/min | 30 s - 150° | 100 | 100 | 114 |
| H-4 | 4% of PI-1 | 20 m/min | 30 s - 150° | 112 | 112 | 130 |
| H-2 + 50% of kaolin | 4% of PI-1 | 20 m/min | 15 s - 100° | 120 | 130 | 185 |
| H-2 + 50% of kaolin | 4% of PI-1 | 30 m/min | 15 s - 100° | 120 | 130 | 185 |
| H-2 + 50% of kaolin | 4% of PI-1 | 30 m/min | 30 s - 100° | 92 | 98 | 145 |
| H-1/H-2 80:20 + 25% of kaolin | 4% of PI-1 | 20 m/min | 30 s - 100° | 170 | 177 | 200 |
| H-1/H-2 80:20 + 25% of kaolin | 4% of PI-1 | 30 m/min | 30 s - 100° | 110 | 115 | 150 |
| H-1/H-5 90:10 | 4% of PI-1 | 10 m/min | 60 s - 100° | 196 | 210 | 210 |
| H-1/H-5 70:30 | 4% of PI-1 | 10 m/min | 60 s - 100° | 196 | 200 | 220 |
| H-1/H-5 50:50 | 4% of PI-1 | 10 m/min | 60 s - 100° | 161 | 170 | 187 |
| H-2/H-5 90:10 | 4% of PI-1 | 20 m/min | 120 s - 50° | 38 | 58 | 182 |
| H-2/H-5 70:30 | 4% of PI-1 | 20 m/min | 120 s - 50° | 45 | 53 | 155 |
| H-2/H-5 50:50 | 4% of PI-1 | 20 m/min | 120 s - 50° | 28 | 35 | 158 |
| H-1 | 4% of PI-2 | 10 m/min | 60 s - 60° | 77 | 154 | 240 |
| H-1 | 4% of PI-2 | 10 m/min | 60 s - 100° | 210 | 224 | 230 |
| H-2 | 4% of PI-2 | 10 m/min | 60 s - 75° | 148 | 158 | 165 |
| H-2 | 4% of PI-2 | 10 m/min | 60 s - 100° | 172 | 172 | 187 |
| H-2 | 4% of PI-2 | 10 m/min | 120 s - 75° | 160 | 170 | 187 |

What is claimed is:
1. A process for the preparation of an abrasive by applying a layer of binder to a support, briefly irradiating said layer with actinic light, applying the abrasive to the still tacky layer before or after irradiation and subsequent or simultaneous heat curing, said binder compris- ing an epoxy resin which is free of ethylenically unsaturated groups or said binder is a mixture of several epoxy resins which mixture is free of ethylenically unsaturated compounds and said binder contains at least one cationic photoinitiator.

2. A process according to claim 1, which comprises applying and curing a second layer of binder subsequent to the application of the abrasive particles or to the heat curing of the first layer, the binder of said second layer being the same as, or different from, the binder of the first layer.

3. A process according to claim 1, wherein the support is a paper or fabric which is uncoated or coated with a primer.

4. A process according to claim 1, wherein irradiation is effected with light in the wavelength range from 200-600 nm.

5. A process according to claim 1, wherein heat curing is effected in the temperature range from 50°-200° C.

6. A process according to claim 5, wherein the heat curing is effected in the temperature range from 70°-150° C.

7. A process according to claim 1, wherein the photoinitiator is an aromatic sulfonium salt, an aromatic iodonium salt or an arene/iron complex salt containing an anion selected from the group consisting of $BF_4^-$, $PF_6^-$, $AsF_6^-$, $SbCl_6^-$ or $BiCl_6^-$.

8. A process according to claim 7, wherein the photoinitiator is a compound of formula $[R^1\text{-Fe-}R^2]^+[MX_m]^-$, wherein $R^1$ is an uncharged arene ligand, $R^2$ is a monovalent cyclopentadienyl or methylcyclopentadienyl anion and $[MX_m]^-$ is an anion of formula $BF_4^-$, $PF_6^-$, $AsF_6^-$ or $SbF_6^-$.

9. A process according to claim 7, which comprises using a sensitiser or an oxidative activator in addition to the photoinitiator.

10. A process according to claim 9, wherein the sensitiser is a thioxanthone, anthracene or coumarin compound.

11. An abrasive prepared by the process as claimed in claim 1.

12. An abrasive paper according to claim 11.

13. The process of claim 1 wherein said binder is a mixture of said epoxy resin and a phenolic resin.

* * * * *